United States Patent
Grosse Brinkhaus

(10) Patent No.: US 12,302,778 B2
(45) Date of Patent: May 20, 2025

(54) METHOD FOR SPREADING SPREADING MATERIAL ONTO AGRICULTURAL LAND

(71) Applicant: Amazonen-Werke H. Dreyer SE & Co. KG, Hasbergen (DE)

(72) Inventor: Andre Grosse Brinkhaus, Münster (DE)

(73) Assignee: Amazonen-Werke H. Dreyer SE & Co. KG, Hasbergen (DE)

(*) Notice: Subject to any disclaimer, the term of this patent is extended or adjusted under 35 U.S.C. 154(b) by 490 days.

(21) Appl. No.: 17/497,684

(22) Filed: Oct. 8, 2021

(65) Prior Publication Data
US 2022/0110242 A1    Apr. 14, 2022

(51) Int. Cl.
*A01C 15/18*    (2006.01)
*A01C 17/00*    (2006.01)
*G05D 1/00*    (2024.01)

(52) U.S. Cl.
CPC ............ *A01C 15/18* (2013.01); *A01C 17/008* (2013.01); *G05D 1/0219* (2013.01)

(58) Field of Classification Search
CPC .... A01C 17/001; A01C 17/008; A01C 21/005
USPC .................................................. 239/681, 682
See application file for complete search history.

(56) References Cited

U.S. PATENT DOCUMENTS

| | | | | |
|---|---|---|---|---|
| 9,649,646 | B1* | 5/2017 | Podoll | B05B 7/0815 |
| 2006/0200294 | A1* | 9/2006 | Scheufler | A01B 79/005 |
| | | | | 701/41 |
| 2020/0068796 | A1* | 3/2020 | Dreyer | A01C 21/005 |
| 2020/0275603 | A1* | 9/2020 | Rahe | A01C 17/008 |

FOREIGN PATENT DOCUMENTS

| | | | |
|---|---|---|---|
| DE | 102014115560 A1 | 4/2016 | |
| EP | 2417848 A2 * | 2/2012 | .......... A01C 17/008 |
| EP | 2752114 A1 | 7/2014 | |
| EP | 3453241 A1 | 3/2019 | |

* cited by examiner

*Primary Examiner* — Cody J Lieuwen
(74) *Attorney, Agent, or Firm* — Potomac Law Group, PLLC; John J. Penny, Jr.

(57) ABSTRACT

The invention relates to a method for spreading spreading material onto agricultural land (12) by way of an agricultural spreader (10), with the steps of: providing information on spreading boundaries (14) of agricultural land (12) to an electronic control device and moving the agricultural spreader (10) in the direction of a predetermined activation point in the vicinity of a spreading boundary (14) of the agricultural land (12) at which the start of dispensing spreading material onto at least one spreading disk is intended, where, while the dispensing of the spreading material is interrupted, the electronic control device automatically induces an anticipatory setting for a start configuration predetermined for the activation point at the agricultural spreader (10) before the agricultural spreader (10) reaches the activation point.

3 Claims, 1 Drawing Sheet

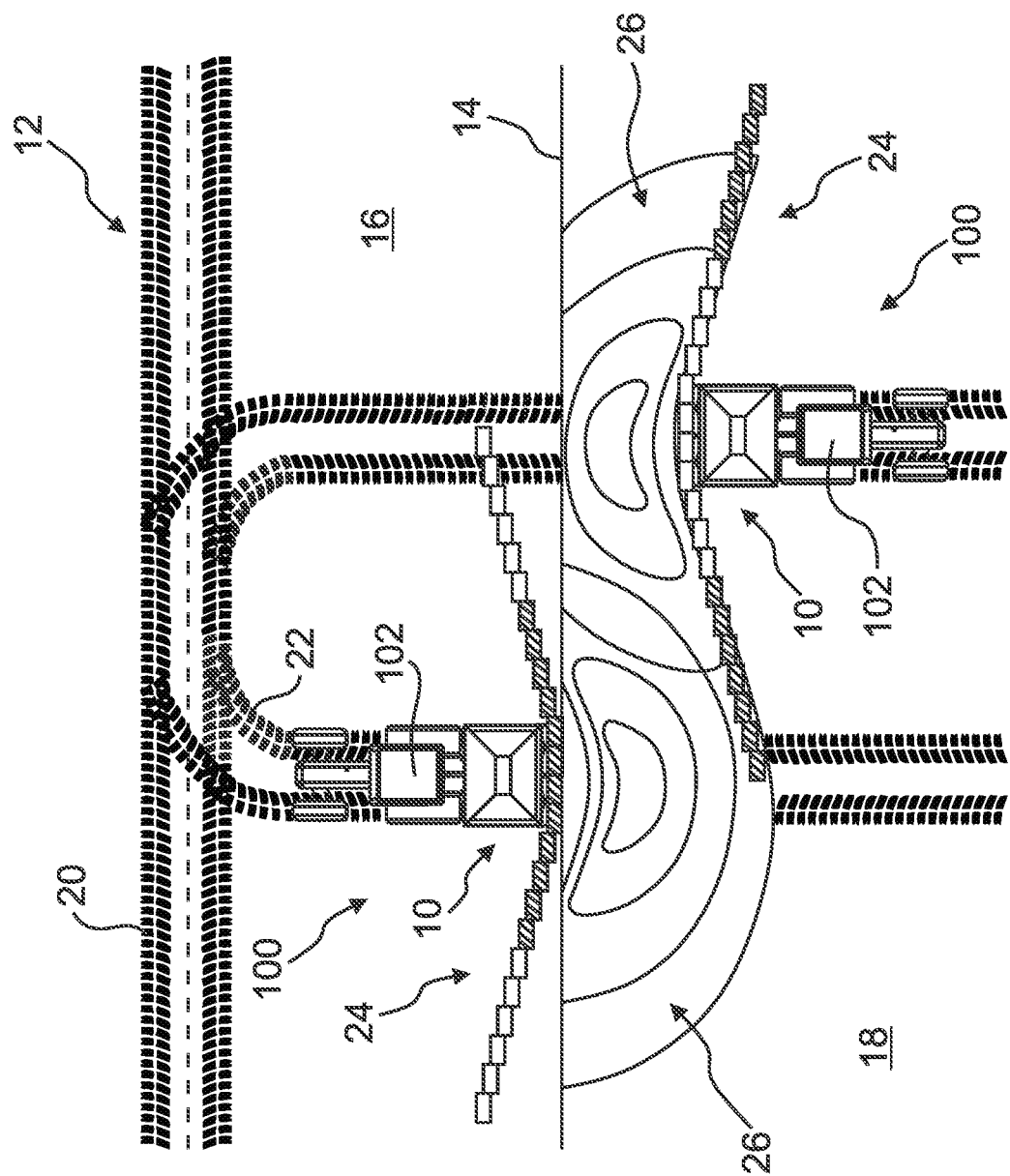

METHOD FOR SPREADING SPREADING MATERIAL ONTO AGRICULTURAL LAND

REFERENCE TO RELATED APPLICATIONS

This application claims priority to, and the benefit of German Application DE 10 2020 126 932.3, filed on Oct. 14, 2020, the contents of which are hereby incorporated by reference.

DESCRIPTION

The invention relates to a method for spreading spreading material onto agricultural land and an agricultural spreader.

When spreading spreading material on agricultural land, the spreading of spreading material is to be temporarily interrupted in the vicinity of the spreading boundaries across which the agricultural spreader travels during the spreading process, so that, for example, spreading spreading material outside the agricultural land is prevented or excessive spreading of spreading material in the transition to the headland is prevented. In particular when travelling into and out of the headland, it is regularly necessary to temporarily interrupt the spreading of the spreading material.

When travelling out of the headland, the spreading of the spreading material must be continued at a specified activation point in order to be able to obtain the intended distribution of the spreading material on the agricultural land. Setting of suitable machine configuration in the vicinity of a spreading boundary following an interruption in the spreading of spreading material continues to be a considerable problem in practice, as a result of which considerable deviations from an intended distribution of spreading material on the agricultural land can occur, especially in boundary regions. In order to improve the spreading of spreading material in the transition region to the headland, publication DE 10 2014 115 560 A1 suggests anticipatory quantity regulation while travelling on the headland, so that a suitable amount of spreading material is immediately available to be dispensed onto the spreading disks when the spreading of spreading material is continued.

Publication EP 2 417 848 A2 furthermore discloses the setting of a standard configuration at an agricultural spreader for the spreading process in the interior of the field, where the standard configuration is set at transition points. The metering members are also activated at the transition points so that the standard configuration is set while the spreading material is dispensed.

With the measures previously known, however, the spreading of spreading material in boundary regions can only be improved slightly, so that it was previously not possible to avoid significant deviations from an intended distribution of spreading material, especially in the transition to the headland.

The object underlying the invention is therefore to improve the spreading of spreading material in the vicinity of the spreading boundaries of agricultural land.

The object is satisfied by a method of the kind mentioned at the outset, where, when the spreading of the spreading material is interrupted, the electronic control device in the context of the method according to the invention automatically induces the anticipatory setting for a start configuration predetermined for the activation point at the agricultural spreader before the agricultural spreader reaches the activation point.

The invention makes use of the knowledge that preparatory control measures are also taken when no spreading material is dispensed onto the spreading disks of the agricultural spreader. The start configuration predetermined for the activation point can therefore be preset while the spreading of the spreading material is interrupted. The start configuration predetermined for the activation point leads directly to an intended distribution of the spreading material in the area of the agricultural land adjoining the spreading boundary when the dispensing of the spreading material onto the at least one spreading disk of the agricultural spreader is started at the activation point.

The activation point and the start configuration depend on the spreading material to be spread and can be calculated before the spreading material is spread. The activation point and/or the start configuration can be calculated within or outside the machine. The spreading boundaries can be spreading boundaries within the area or external boundaries of the agricultural land. The spreading boundaries within the area can be the boundaries between the headland and an inner area of the agricultural land. When the agricultural spreader is moved in the direction of the activation point, the agricultural spreader in this case is then located in the headland of the agricultural land. If the spreading boundary towards which the agricultural spreader is moving is an external boundary of the agricultural land, then the agricultural spreader is, for example, outside the agricultural land when it moves in the direction of the activation point. This situation arises, for example, when travelling onto the agricultural land for the first time at the beginning of the spreading process.

For example, the electronic control device can be part of the agricultural spreader. The electronic control device can comprise a terminal which can be used during the spreading process in the driver's cab of a tractor to which the agricultural spreader is attached. The terminal can be connected to a task controller of the agricultural spreader in a manner conducting signals. The terminal can therefore be viewed as a functional component of the electronic control device of the agricultural spreader. The information on the spreading boundaries can be made available to the electronic control device, in particular to the terminal, by way of a data packet. The data packet can be generated in different ways in advance of the spreading process. The task controller of the spreader can receive control commands from the terminal for setting the start configuration.

The spreader can comprise two spreading disks arranged adjacent to one another. The spreader can be a fertilizer spreader, in particular a dual-disk centrifugal fertilizer spreader.

In a further preferred embodiment of the method according to the invention, a starting rotational speed predetermined for the activation point is set on the at least one spreading disk when the start configuration is set in an anticipatory manner at the agricultural spreader while the spreading of spreading material is interrupted When the dispensing the spreading material onto the at least one spreading disk at the activation point is induced, the at least one spreading disk then already rotates at the predetermined starting rotational speed, so that no further speed adjustment is required after the spreading of spreading material has been induced. The starting rotational speed predetermined for the activation point at the at least one spreading disk, in combination with the further machine configuration, leads directly to an intended distribution of the spreading material in the area of the agricultural land adjoining the spreading boundary when the dispensing of the spreading material onto the at least one spreading disk is started.

In a further preferred embodiment of the method according to the invention, a dispensing point predetermined for the activation point is set at a dispensing point setting device of the agricultural spreader when the start configuration is set in an anticipatory manner at the agricultural spreader while the spreading of spreading material is interrupted. When the agricultural spreader reaches the activation point, the required dispensing point has therefore already been set at the dispensing point setting device, so that no further adjustment of the dispensing point setting device is required. When the dispensing of spreading material onto the at least one spreading disk is started, the dispensing point setting predetermined for the activation point at the dispensing point setting device of the agricultural spreader, in combination with the further machine configuration, leads directly to an intended distribution of the spreading material at the activation point in the area of the agricultural land adjoining the spreading boundary. The dispensing point setting device can comprise an adjustment mechanism with which the position and/or shape of an outlet opening can be changed. The spreading material can leave a storage container via the outlet opening and, under the action of gravity, drop onto a spreading disk arranged below the outlet opening. The adjustment mechanism can comprise a pusher with which a spreading material passage for adjusting the position and/or shape of the outlet opening can be covered or closed in part or entirely.

A method according to the invention is also advantageous in which the electronic control device automatically induces an interruption of the dispensing of the spreading material onto the at least one spreading disk of the agricultural spreader before the agricultural spreader is moved in the direction of the activation point when a predetermined deactivation point in the vicinity of the spreading boundary of the agricultural land has been reached. In this case, the agricultural spreader is therefore moved in the direction of the predetermined deactivation point in the vicinity of a spreading boundary of the agricultural land at which the interruption of the dispensing of the spreading material onto the at least one spreading disk is intended. The agricultural spreader therefore moves, for example, from the inner area of the field towards the headland. The deactivation point depends on the spreading material to be spread and can be calculated prior to the spreading material being spread. The deactivation point can be calculated within or outside the machine. The start of the dispensing the spreading material onto the at least spreading disk at the activation point in this case represents, for example, a continuation of the spreading of the spreading material in the adjacent travel lane.

A method according to the invention is further preferred in which the electronic control device induces the anticipatory setting of the start configuration at the agricultural spreader directly after the dispensing of the spreading material onto the at least one spreading disk of the agricultural spreader has been interrupted at the deactivation point. The preparatory setting measures for the re-dispensing of spreading material are induced, for example, already when travelling into the headland. While travelling on the headland, a turning maneuver typically takes place so that the adjacent travel lane can be traveled in the opposite direction. Dispensing the spreading material is interrupted during the turning maneuver in the headland. The time span during which the turning maneuver takes place within the headland can therefore be used for the anticipatory setting of the start configuration.

In a further preferred embodiment of the method according to the invention, the agricultural spreader comprises part-width section control with which several part-width sections can be activated and deactivated for adapting the spreading width. The part-width section control in the start configuration of the agricultural spreader is disposed in a start control mode with several part-width sections deactivated. In the vicinity of the boundary, spreading material distribution is first executed in which individual part-width sections are activated and individual part-width sections are deactivated.

In a further development of the method according to the invention, the electronic control device induces the deactivated part-width sections of the part-width section control to be activated step-by-step once the activation point has been passed. Once the activation point has been passed, that distribution of spreading material which is predetermined for the spreading in the inner area of the agricultural land while parallel travel is conducted is therefore adjusted step by step. As the distance from the spreading boundary increases, the configuration of the agricultural spreader gradually moves away from the start configuration.

In the start control mode of the part-width section control, one or more outer part-width sections are activated and several inner part-width sections are deactivated in a further preferred embodiment of the method according to the invention. The deactivated inner part-width sections are activated step-by-step from the outside to the inside once the activation point has been passed. The spreading pattern of the agricultural spreader preferably has a sickle shape, where the outer sickle tips point forwardly, i.e. in the direction of travel. When traversing a spreading boundary, the outer part-width sections, which are located in the region of the sickle tips, first need be activated in order to continue the spreading of the spreading material. When travelling from the headland into the interior of the field, the part-width sections are activated from the outside to the inside. When travelling from the interior of the field into the headland, the part-width sections are deactivated from the outside to the inside. In the start configuration of the spreader or in the start control mode of the part-width section control, respectively, at least one spreading disk therefore has a comparatively high rotational speed and the dispensing point setting device specifies a dispensing point that is rotated outwardly relatively strongly. After passing the activation point, the dispensing point is then rotated inwardly by the dispensing point setting device in order to obtain the standard setting for the interior of the field.

The object underlying the invention is also satisfied by an agricultural spreader of the kind mentioned at the outset, where, when the spreading of spreading material is interrupted, the electronic control device is configured to automatically induce an anticipatory setting for a start configuration predetermined for the activation point at the agricultural spreader in the vicinity of a spreading boundary of the agricultural land at which the start of dispensing the spreading material onto at least one spreading disk is intended before the agricultural spreader reaches the activation point. The method according to the invention for spreading spreading material can preferably be carried out according to one of the embodiments described above with the agricultural spreader according to the invention. With regard to the advantages and modifications of the spreader according to the invention, reference is first made to the advantages and modifications of the method according to the invention.

The control device of the agricultural spreader can comprise a terminal which can be disposed in the driver's cab of a tractor while the spreading material is being spread. The spreader is preferably an attachment device that is mounted onto the tractor. When spreading material is spread, the terminal forms a functional part of the agricultural spreader. The terminal can be connected to a task controller of the agricultural spreader in a manner conducting signals, for example, via a bus system. The task controller of the agricultural spreader can receive control commands from the agricultural spreader and induce the setting of the start configuration at the agricultural spreader by way of the control commands received.

In a preferred embodiment of the agricultural spreader according to the invention, the electronic control device is configured to induce the setting of a starting rotational speed at the predetermined at least one spreading disk for the activation point when the start configuration is set in an anticipatory manner at the agricultural spreader while the spreading of spreading material is interrupted. Alternatively or additionally, the electronic control device can be configured to induce the setting of a dispensing point setting predetermined for the activation point at the dispensing point setting device of the agricultural spreader when the start configuration is set in an anticipatory manner at the agricultural spreader while the spreading of spreading material is interrupted. The agricultural spreader is therefore configured to set a predetermined starting rotational speed and/or a predetermined dispensing point setting at the dispensing point setting device during a motion in the direction of the spreading boundary while the spreading of spreading material is interrupted. When the activation point has been reached, the intended spreading pattern is therefore implemented directly without the need for further adjustment of the spreading disk rotational speed and/or the dispensing point setting device.

The agricultural spreader according to the invention is further developed advantageously in that the electronic control device is configured to induce the anticipatory setting of the start configuration at the agricultural spreader directly after the dispensing of the spreading material onto the at least one spreading disk of the agricultural spreader has been interrupted at a deactivation point. The preparatory setting measures for the re-dispensing of spreading material onto the spreading disk are therefore induced, for example, already when travelling into the headland.

In a further preferred embodiment, the agricultural spreader according to the invention comprises a part-width section control with which part-width sections can be activated and deactivated for adapting the spreading width. The electronic control device can be configured to induce the deactivated part-width sections of the part-width section control to be activated step-by-step once the activation point has been passed.

A preferred embodiment of the invention shall be explained and described in more detail below with reference to the accompanying drawings, where FIG. 1 shows an agricultural spreader while carrying out the method according to the invention.

FIG. 1 shows a spreading process for spreading material. The spreading material is spread from a combination 100 of a vehicle 102 and an agricultural spreader 10. Vehicle 102 is a tractor, where agricultural spreader 10 is a fertilizer spreader. Spreader 10 is configured as an attachment device and is connected to vehicle 102 by way of a three-point power lift.

The section of agricultural land 12 illustrated shows a spreading boundary 14 which delimits headland 16 from inner area 18 of agricultural land 12. Running within headland 16 is travel lane 20, toward which combination 100 initially moves when travelling along travel lane 22 and later again moves away therefrom. Combination 100 performs a turning maneuver within headland 16.

Agricultural spreader 10 comprises two spreading disks arranged adjacent to one another, where each spreading disk is associated with a dispensing point setting device. The dispensing point of the spreading material dispensed onto the respective spreading disk can be set by way of the dispensing point setting device. In addition, agricultural spreader 10 according to the invention comprises a part-width section control with which part-width sections 24 can be activated and deactivated for adapting the spreading width. Spreading pattern 26 of agricultural spreader 10 preferably has a sickle shape, where the outer sickle tips point forwardly, i.e. in the direction of travel. When travelling out of inner area 16 into headland 16, part-width sections 24 are deactivated from the outside to the inside. When travelling into inner area 18, part-width sections 24 are activated from the outside to the inside.

Agricultural spreader 10 further comprises an electronic control device. The electronic control device can comprise, for example, a task controller and a terminal connected to the task controller in a signal-conducting manner. The terminal can be carried along in the driver's cab of vehicle 102 during the spreading process, since the terminal can show the vehicle driver additional information on the spreading process on a display. The operation of the spreading disks and the operation of the dispensing point setting device can be controlled by way of the electronic control device.

The electronic control device was provided with information on spreading boundaries 14 of agricultural land 12 in advance of the spreading situation shown. The information on spreading boundaries 14 can be provided, for example, via a data packet which is retrieved by the terminal. The data packet comprises information on the course of spreading boundaries within the field, such as spreading boundary 14 shown between headland 16 and inner area 18, and outer boundaries of agricultural land 12.

When travelling travel lane 22, agricultural spreader 10 moves in the direction of a predetermined deactivation point in the vicinity of spreading boundary 14. When the predetermined deactivation point in the vicinity of spreading boundary 14 has been reached, the electronic control device automatically interrupts the dispensing of spreading material onto the spreading disks of agricultural spreader 10. Immediately after the dispensing of spreading material has been interrupted, the electronic control device induces an anticipatory setting for a start configuration at agricultural spreader 10. The start configuration is predetermined and relates to an activation point in the vicinity of spreading boundary 14 at which the dispensing of spreading material onto the spreading disks is to be continued again after the turning maneuver has been performed. When the dispensing of spreading material is interrupted, the electronic control device automatically induces the anticipatory setting of the start configuration predetermined for the activation point on the agricultural spreader before agricultural spreader 10 reaches the activation point. The preparatory setting measures for the re-dispensing of spreading material onto the spreading disks are therefore induced, for example, already when travelling into the headland. The start configuration predetermined for the activation point leads directly to the intended distribution of the spreading material in the area of agricultural land 12 adjoining spreading boundary 14 when the dispensing of the spreading material onto the spreading disk is started at the activation point.

With the anticipatory setting of the start configuration while travelling on headland 16, a starting rotational speed predetermined for the activation point is set at the spreading disks when the spreading of spreading material is interrupted. Furthermore, with the anticipatory setting of the start configuration while travelling on headland 16, a dispensing point setting predetermined for the activation point is performed at the dispensing point setting devices of agricultural spreader 10.

The electronic control device induces deactivated part-width sections 24 of the part-width section control to be activated step-by-step once the activation point has been passed. In the vicinity of the boundary, the spreading of the spreading material takes place first in the region of outer part-width sections 24. Once the activation point has been passed, that distribution of spreading material is set step by step which is predetermined for the spreading in inner area of agricultural land 12 when parallel travel is conducted. For this purpose, the inner part-width sections are gradually activated.

The part-width section control in the start configuration of agricultural spreader 10 is therefore first disposed in a start control mode with several part-width sections 24 deactivated. In the start configuration of part-width section control, several outer part-width sections 24 are activated and several inner part-width sections 24 are deactivated After the activation point has been passed, inner sections 24 are activated step-by-step from the outside to the inside.

LIST OF REFERENCE CHARACTERS

10 spreader
12 agricultural land
14 spreading boundary
16 headland
18 inner area
20 travel lane
22 travel lane
24 part-width sections
26 spreading patterns
100 combine
102 vehicle

The invention claimed is:

1. An agricultural spreader for spreading material comprising:
　at least one spreading disk;
　at least one dispensing point setting device, with which a dispensing point of said spreading material dispensed onto said spreading disk can be set; and
　an electronic control device which is configured to process information on spreading boundaries of agricultural land and with which the operation of said at least one spreading disk and the operation of said at least one dispensing point setting device can be controlled;
　wherein the spreading of spreading material is interrupted, said electronic control device is configured to automatically induce an anticipatory setting for a start configuration predetermined for an activation point at the agricultural spreader in the vicinity of a spreading boundary of said agricultural land at which the start of dispensing said spreading material onto at least one spreading disk is intended before said agricultural spreader reaches the activation point,
　wherein said electronic control device is further configured to:
　induce the setting of a starting rotational speed predetermined for said activation point at said at least one spreading disk when said start configuration is set in an anticipatory manner at said agricultural spreader while the spreading of spreading material is interrupted, such that said at least one spreading disk already rotates at the predetermined starting rotational speed at the activation point; or
　induce the setting of a dispensing point predetermined for said activation point at said at least one dispensing point setting device of said agricultural spreader when said start configuration is set in an anticipatory manner at said agricultural spreader while the spreading of spreading material is interrupted, such that the predetermined dispensing point is already set at the activation point.

2. The agricultural spreader according to claim 1, wherein said electronic control device is configured to induce the anticipatory setting of said start configuration at said agricultural spreader directly after the dispensing of spreading material onto said at least one spreading disk of said agricultural spreader has been interrupted at a deactivation point.

3. The agricultural spreader according to claim 1, further comprising:
　a part-width section control with which part-width sections can be activated and deactivated for adapting the spreading width,
　where said electronic control device is configured to induce deactivated part-width sections of said part-width section control to be activated step-by-step once said activation point has been passed.

* * * * *